United States Patent [19]

McKeever

[11] Patent Number: 4,609,205

[45] Date of Patent: Sep. 2, 1986

[54] SHOULDER BELT POSITIONER

[76] Inventor: Margaret L. McKeever, 1530 Sherwood, SE., Grand Rapids, Mich. 49506

[21] Appl. No.: 780,672

[22] Filed: Sep. 26, 1985

[51] Int. Cl.[4] .............................................. B60R 21/10

[52] U.S. Cl. .................................... 280/808; 297/483; 297/486

[58] Field of Search ................ 280/801, 808; 297/468, 297/483, 486

[56] References Cited

U.S. PATENT DOCUMENTS

| | | | |
|---|---|---|---|
| 3,000,418 | 9/1961 | Bitting | 150/52 R |
| 3,236,540 | 2/1966 | Berton et al. | 297/483 |
| 3,521,901 | 7/1970 | Wackym | 297/483 |
| 3,567,247 | 3/1971 | Sobkow et al. | 280/808 |
| 3,820,842 | 6/1974 | Stephenson | 280/733 |
| 3,834,730 | 9/1974 | Kansier | 297/483 |
| 3,842,929 | 10/1974 | Wada et al. | 280/804 |
| 4,033,594 | 7/1977 | Lindblad | 297/481 |
| 4,056,271 | 11/1977 | Imabuchi et al. | 280/804 |
| 4,098,524 | 7/1978 | Ardizio | 280/801 |
| 4,236,755 | 12/1980 | Pollitt et al. | 297/483 |
| 4,247,131 | 1/1981 | Fiehl | 280/808 |
| 4,284,294 | 8/1981 | Takada | 280/803 |
| 4,292,932 | 10/1981 | Wooderson | 119/109 |
| 4,312,539 | 1/1982 | Takada | 297/468 |
| 4,319,769 | 3/1982 | Compeau et al. | 280/808 |
| 4,348,037 | 9/1982 | Law et al. | 280/733 |
| 4,466,666 | 8/1984 | Takada | 297/483 |
| 4,482,187 | 11/1984 | Nagashima et al. | 297/468 |

FOREIGN PATENT DOCUMENTS

| | | | |
|---|---|---|---|
| 2437845 | 4/1980 | France | 280/808 |

*Primary Examiner*—John J. Love
*Assistant Examiner*—Kenneth R. Rice
*Attorney, Agent, or Firm*—Price, Heneveld, Huizenga & Cooper

[57] ABSTRACT

A shoulder belt positioner is provided for vehicles, and the like of the type having safety belt restraint systems. The positioner comprises a flexible strap having a hanger bracket at one end, and an open hook at the other end. The hanger bracket releasably supports the positioner on the door of the vehicle, preferably by an inverted U-shaped clip that is closely received in the window slot of the vehicle door. The positioner hook has a generally V-shaped configuration to releasably engage the shoulder belt in the extended, locked position, and pull the same slightly off of the user's shoulder to provide improved comfort. The positioner hook automatically releases the shoulder belt when the belt is moved to its retracted, storage position. The positioner preferably moves with the door as it is opened to an out of the way location to permit unobstructed exit from and entry into the vehicle.

20 Claims, 6 Drawing Figures

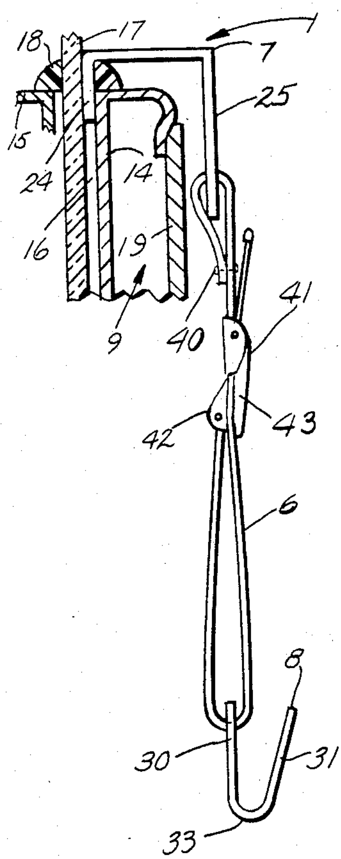
Fig. 1.
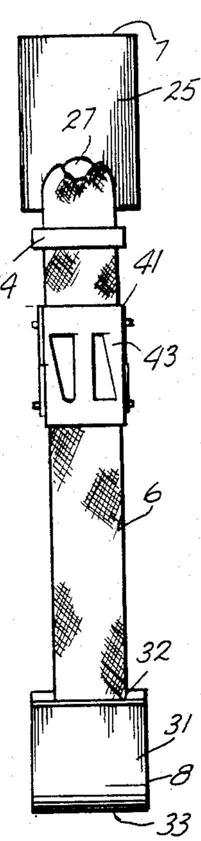
Fig. 2.
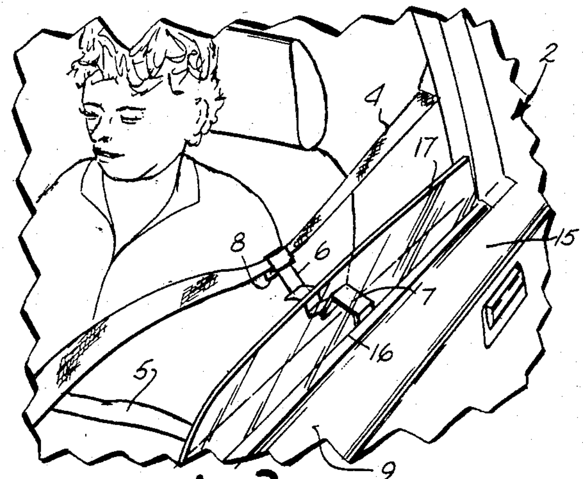
Fig. 3.
Fig. 4.
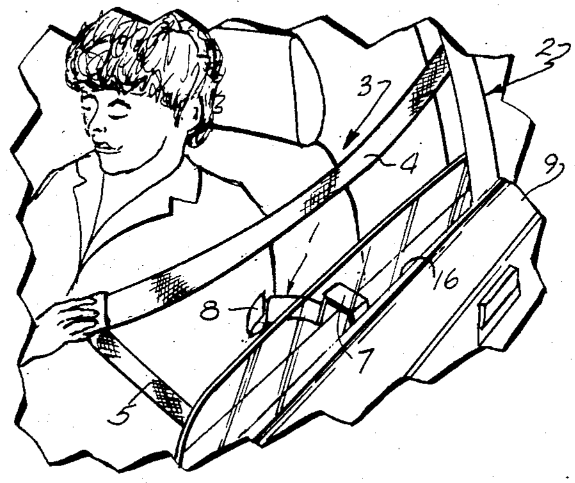
Fig. 5.
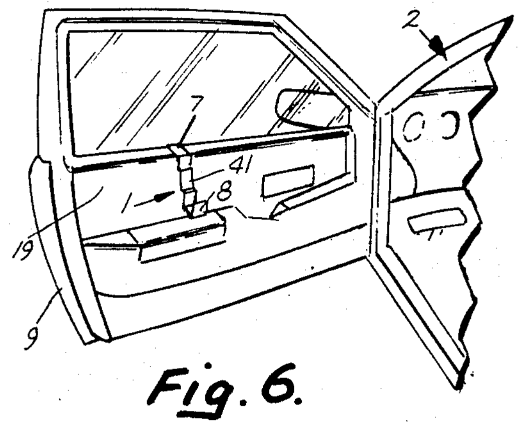
Fig. 6.

SHOULDER BELT POSITIONER

BACKGROUND OF THE INVENTION

The present invention relates to safety belts and harnesses, and in particular to a shoulder belt positioner for vehicles and the like.

Safety belts and harnesses are well known in the art as an occupant restraining device for passenger vehicles. Such devices typically include a shoulder strap, which crosses diagonally across the front of the user's body. The lower end of the shoulder strap is usually anchored in the vehicle near the center of the user's seat, and the outer end of the belt passes over the shoulder of the user and is anchored at a location generally above and behind the user.

Contact between the shoulder belt and the shoulder of the user can cause chaffing of the skin, and other discomfort and/or annoyance. This discomfort is particularly exacerbated during hot weather, when the user's shoulder is normally not covered by clothing. The constant pressure applied by the shoulder belt to the user's shoulder can annoy the user, and distract the driver of the vehicle.

SUMMARY OF THE INVENTION

One aspect of the present invention is to provide a shoulder belt positioner for vehicles and the like of the type having a safety belt restraint system. The positioner comprises a flexible strap having a hanger bracket at one end, and an open hook at the other end. The hanger bracket supports the positioner on the door or window portion of the vehicle alongside the user's seat. The hook has a generally V-shaped configuration to releasably engage the shoulder belt in the extended, locked position, and pull the same slightly off of the user's shoulder for improved user comfort. The hook automatically releases the shoulder belt when the belt is moved into its retracted, storage position.

Preferably, the positioner is attached to the door of a vehicle, such that it bodily moves with the door as it is opened to an out-of-the-way location, thereby permitting unobstructed exit from and entry into the vehicle.

The principal objects of the present invention are to provide a positioner for shoulder belts that accords the user greater comfort. The positioner pulls the shoulder belt slightly off of the shoulder of the user to prevent skin chaffing, and other related discomfort and annoyance. The positioner automatically releases the shoulder belt when the belt is moved into the retracted storage position, and preferably moves with the door to an out-of-the-way location to permit unobstructed exit from and entry into the vehicle. The positioner has an uncomplicated construction, and is particularly economical to manufacture, efficient in use, capable of a long operating life, and well adapted for the proposed use.

These and other features, advantages and objects of the present invention will be further understood and appreciated by those skilled in the art by reference to the following written specification, claims and appended drawings.

BRIEF DESCRIPTION OF THE DRAWINGS

FIG. 1 is a side elevational view of a shoulder belt positioner embodying the present invention, shown installed in a portion of a vehicle illustrated in cross-section.

FIG. 2 is a front elevational view of the positioner.

FIG. 3 is a perspective view of the positioner, shown attached to a shoulder belt in an extended, locked position, with the user in a forwardly facing orientation.

FIG. 4 is a perspective view of the positioner, shown attached to the shoulder belt in an extended, locked position with the user shown in a rearwardly facing orientation.

FIG. 5 is a perspective view of the positioner, shown releasing itself from the shoulder belt as the belt is moved to a retracted, storage position.

FIG. 6 is a perspective view of the positioner, shown detached from the shoulder belt, and supported on a door of the vehicle illustrated in an opened position.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIGS. 1–3. However, it is to be understood that the invention may assume various alternative orientations, except where expressly specified to the contrary.

The reference numeral 1 (FIG. 1) generally designates a shoulder belt positioner embodying the present invention. Positioner 1 is particularly adapted for use in conjunction with vehicles and the like, such as the illustrated automobile 2 (FIG. 5), which has a safety harness restraint system 3, comprising a combination shoulder belt 4 and seat belt 5. Positioner 1 (FIGS. 1 and 2) comprises a flexible strap 6, having a hanger bracket 7 at one end, and an open hook 8 at the other end. Hanger bracket 7 is attached to a side portion of automobile 2, such as at the window slot portion of vehicle door 9. Positioner hook 8 has a generally V-shaped configuration to releasably engage shoulder belt 4 in the extended, locked position, and pull the same slightly off of the user's shoulder, as shown in FIG. 3, to provide improved user comfort. Positioner hook 8 automatically releases shoulder belt 4 when the belt is moved to its retracted, storage position, as shown in FIG. 5. Preferably, positioner 1 is attached to a door 9 of vehicle 2, such that positioner 1 moves with vehicle door 9 as it is opened to an out-of-the-way location, as shown in FIG. 6 to permit unobstructed exit from and entry into automobile 2.

Positioner 1 is adapted to be used in conjunction with a wide variety of different types of automobiles and safety harness arrangements. One such application of the present invention is illustrated in the attached drawings, wherein FIG. 1 shows vehicle door 9, which has a conventional construction. The illustrated vehicle door 9 includes inner and outer door panels 14 and 15 respectively, between which a window slot 16 is defined. A window pane or panel 17 is positioned within window slot 16, and extends and retracts within vehicle door 9 in a conventional manner. Window seal strips 18 and 19 are mounted on the upper portions of door panels 14 and 15, and abut the opposite surfaces of window pane 17 to form a weathertight seal therebetween. A cover panel 19 is mounted on interior side of door panel 14.

The illustrated hanger bracket 7 has an inverted, generally U-shaped configuration when viewed in side elevation, as shown in FIG. 1. More specifically, hanger bracket 7 includes opposite flanges 24 and 25 and a connecting web 26. Flanges 24 and 25 are oriented substantially parallel, and are mutually perpendicular to web 26. Inner flange 24 forms a clip that is shaped to be closely received in the window slot 16 of vehicle door 9, as described in greater detail hereinafter. Preferably, inner flange 24 has a width which is sufficiently less than window slot 16 to permit positioner 1 to be manually slid lengthwise along the window slot. The outer flange 25 of hanger bracket 7 is longer than inner flange 24, and includes an aperture 27 through the lower end thereof in which flexible strap 6 is positioned. Hanger bracket 7 has a generally rigid construction to maintain its desired shape, and may be constructed of formed sheet metal, molded plastic, or other comparable materials.

Positioner hook 8 has a generally V-shaped configuration when viewed in side elevation as shown in FIG. 1, and includes opposite legs 30 and 31. Leg 30 is slightly longer than leg 31, and includes an aperture 32 therethrough at its upper end in which flexible strap 60 is positioned. Positioner hook 8 has a generally arcuately shaped base 33, and a smooth interior surface that permits shoulder belt 4 to slide freely thereover. In the illustrated example, hook legs 30 and 31 are oriented at an angle in the range of 20 to 40 degrees apart, and preferably around 30 degrees apart. Positioner hook 8 has a generally rectangular front elevational shape, as best shown in FIG. 2. Positioner hook 8 has a generally rigid construction to maintain its V shape, and may be constructed of formed sheet metal, molded plastic, and other similar constructions. Positioner hook 8 may also be inelastically deformable by hand, such that the user can manually adjust the angle between hook legs 30 and 31 to adapt positioner 1 for different applications.

Flexible strap 6 connects hanger bracket 7 with positioner hook 8, and is preferably adjustable to adapt positioner 1 for a wide variety of different types of vehicles and users. In the illustrated example, positioner strap 6 is constructed from a strip of woven elastic material, such that it can be stretched lengthwise along its longitudinal axis. The upper end of positioner strap 6 extends through the aperture 27 in hanger bracket 7, with the terminal end doubled back and attached to itself by a fastener 40, such as staples, stitching, or the like. Preferably, positioner strap 6 is adjustable longitudinally to vary its effective length. In the illustrated example, a conventional clasp-type buckle 41 is mounted on the central portion of positioner strap 6. Buckle 41 includes a clip 42 which detachably mounts buckle 41 along the length of positioner strap 6, and a toothed clasp 43 which is adapted to engage the free end of positioner strap 6. The lower end of positioner strap 6 is threaded through the aperture 32 in positioner hook 8, with the free end of strap 6 inserted through clasp 43. The effective length of positioner strap 6 is adjusted not only through the elasticity in the strap, but also by varying the position of the free end of strap 6 with respect to buckle 41. A protector strip 44 is attached to the terminal end of strap 6 to prevent fraying.

In operation, shoulder belt positioner 1 is particularly adapted to be attached to door 9 of automobile 2. The inner flange 24 of hanger bracket 7 is inserted into window slot 16, so as to support positioner 1 on the inside of vehicle door 9. It is noteworthy that hanger bracket 7 can be moved longitudinally along the entire length of window slot 16 to locate positioner 1 at a convenient and comfortable position. The user then buckles safety harness 3 by pulling the free end of shoulder belt 4 downwardly, and locking the same in the buckle (not shown) in the fully extended position. With the user facing in a comfortable, forwardly oriented position, the user grasps the hook portion 8 of positioner 1, and attaches the same to a medial portion of shoulder belt 4, in the manner illustrated in FIG. 3. The position of hanger bracket 7 on vehicle door 9, and the effective length of flexible strap 6 are then adjusted by the seated user so as to pull shoulder belt 4 slightly off of the shoulder of the user, as illustrated in FIG. 3.

In the examples illustrated in FIGS. 3–6, the user of positioner 1 is the driver of automobile 2. However, it is to be understood that positioner 1 can also be adapted for use in conjunction with shoulder straps associated with passengers in automobile 2. In the illustrated example, when the user/driver is oriented in the forwardly facing position illustrated in FIG. 3, positioner 1 holds the upper portion of shoulder belt 4 slightly away from the user's shoulder. In the event that the user/driver turns in his seat to back up automobile 2, or for some other reason shifts his body to look over his right shoulder toward the rear of the vehicle, as illustrated in FIG. 4, hook 8 is shaped so as to maintain its grasp on shoulder belt 4. When the user/driver returns to the forwardly facing position illustrated in FIG. 3, positioner 1 will return to its initial position.

When the user is ready to exit automobile 2, the user releases shoulder belt 4 is unlocked, and permitted to move upwardly to its retracted, storage position, as shown in FIG. 5. Typically, a spring loaded retractor (not shown) automatically pulls shoulder belt 4 upwardly into the fully retracted storage position, such that the user simply unlocks the buckle, and guides shoulder belt 4 with his inside hand, across the front of his body toward the adjacent door 9 of vehicle 2. As shoulder belt 4 moves toward the retracted storage position, positioner 1 automatically releases shoulder belt 4, as shown in FIG. 5 and assume the generally vertical orientation illustrated in FIG. 6. More specifically, translation of shoulder belt 4 into the retracted storage position causes the forward end of the belt to move upwardly, rearwardly, and toward the door of the user, as illustrated in FIG. 5. It is this motion which causes positioner 1 to disengage from shoulder belt 4, and fall under gravitational forces to the hanging storage position illustrated in FIG. 6. Since shoulder belt positioner 1 is attached to or hangs on vehicle door 7, it moves with vehicle door 9 as it is opened to an out-of-the-way location to permit unobstructed exit from and entry into automobile 2.

Shoulder belt positioner 1 provides improved user comfort, and automatically releases from shoulder belt 4 when the belt is moved into its retracted storage position. Positioner 1 is fully adjustable to adapt to a wide variety of different vehicles and users, and has an uncomplicated construction that is economical to manufacture, and efficient in use. By attaching positioner 1 to door 9 of automobile 2, the positioner moves with the door as it is opened to a convenient, out-of-the-way location which permits unobstructed exit from and entry into the automobile.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A safety belt positioner for vehicles and the like of the type having a door, a seat disposed adjacent to the door, and a shoulder belt having an extended, locked position in which the user is restrained in the vehicle seat, and a retracted, storage position in which the user is free to move out of and into the vehicle seat; said positioner comprising:

a flexible strap having first and second ends;

a hanger bracket connected with the first end of said strap, and shaped to removably support said positioner on the vehicle door at an interior side thereof;

an open hook connected with the second end of said strap, and shaped to releasably and selectively engage the shoulder belt; and means for adjusting said positioner to a location wherein the shoulder belt is pulled slightly away from the shoulder of the user in the extended locked position for user comfort, and said open hook automatically releases the shoulder belt as the shoulder belt is moved into the retracted storage position, and bodily translates with the vehicle door as the door is opened to an out-of-the-way position to facilitate unobstructed exit from and entry into the vehicle seat.

2. A safety belt positioner as set forth in claim 1, wherein:

said hook has a smooth interior surface which permits the shoulder belt to slide thereover to accommodate for user movement in the vehicle seat.

3. A safety belt positioner as set forth in claim 2, wherein:

said hanger bracket includes means for adjusting the location of said positioner along the length of the vehicle door.

4. A safety belt positioner as set forth in claim 3, wherein:

said hanger bracket adjusting means includes a support leg shaped to be closely received in a window slot portion of the vehicle door.

5. A safety belt positioner as set forth in claim 4, wherein:

said hanger bracket has an inverted, generally U-shaped configuration.

6. A safety belt positioner as set forth in claim 5, wherein:

said hook has generally V-shaped configuration.

7. A safety belt positioner as set forth in claim 6, including:

means for adjusting the effective length of said strap to adapt said positioner for a wide variety of different types of vehicles and users.

8. A safety belt positioner as set forth in claim 7, wherein:

said strap is elastic and stretches longitudinally.

9. A safety belt positioner as set forth in claim 8, wherein:

said hook includes first and second legs interconnected along an arcuately shaped base.

10. A safety belt positioner as set forth in claim 9, wherein:

said hook is manually inelastically deformable to adjust the mutual position of said first and second hook legs.

11. A safety belt positioner as set forth in claim 1, wherein:

said hanger bracket includes means for adjusting the location of said positioner along the length of the vehicle door.

12. A safety belt positioner as set forth in claim 11, wherein:

said hanger bracket has an inverted, generally U-shaped configuration, with a support leg shaped to be closely received in a window slot portion of the vehicle door to define said hanger bracket adjusting means.

13. A safety belt positioner as set forth in claim 1, including:

means for adjusting the effective length of said strap to adapt said positioner for wide variety of different types of vehicles and users.

14. A safety belt positioner as set forth in claim 1, wherein:

said hook has a generally V-shaped configuration and includes first and second legs interconnected along an arcuately shaped base; and said hook is manually inelastically deformable to adjust the mutual position of said first and second hook legs.

15. In a vehicle of the type having a door, a seat disposed adjacent to said door, and a shoulder belt having an extended, locked position in which the user is restrained in said vehicle seat, and a retracted, storage position in which the user is free to move out of and into said vehicle seat, the improvement of a shoulder belt positioner comprising:

a flexible strap having first and second ends;

a hanger bracket connected with the first end of said strap, and shaped to removably support said positioner on said vehicle door at an interior side thereof;

an open hook connected with the second end of said strap, having a generally V-shaped configuration to releasably engage said shoulder belt in the extended, locked position and pull said shoulder belt slightly away from the shoulder of the user for user comfort, and to automatically release said shoulder belt as the shoulder belt is moved into the retracted storage position, whereby said positioner bodily translates with said vehicle door a said door is opened to an out-of-the-way position to facilitate unobstructed exit from and entry into said vehicle seat.

16. A vehicle as set forth in claim 15, wherein:

said vehicle includes a window slot in said door; and said hanger bracket has an inverted, generally U-shaped configuration with a support leg shaped to be closely received in said window slot of said vehicle door to support said positioner on said door, and provide means for adjusting the position of said positioner along the length of said vehicle door.

17. A vehicle as set forth in claim 15, wherein:

said hook has a generally V-shaped configuration.

18. A vehicle as set forth in claim 15, including:

means for adjusting the effective length of said strap to adapt said positioner for a wide variety of different types of vehicles and users.

19. A safety belt positioner as set forth in claim 15, wherein:

said hook has a generally V-shaped configuration wit first and second legs interconnected along an arcuately shaped base; and said hook is manually inelastically deformable to adjust the mutual position of said first and second hook legs.

20. A safety belt positioner for vehicles and the like of the type having a window, a seat disposed adjacent to the window, and a shoulder belt having an extended, locked position in which the user is restrained in the vehicle seat, and a retracted, storage position in which the user is free to move out of and into the vehicle seat; said positioner comprising:

a flexible strap having first and second ends;

a bracket connected with the first end of said strap, and shaped to removably support said positioner on the vehicle window at an interior side thereof;

an open hook connected with the second end of said strap, and shaped to releasably and selectively engage the shoulder belt; and means for adjusting said positioner to a location wherein the shoulder belt is pulled slightly away from the shoulder of the user in the extended locked position for user comfort, and said open hook automatically releases the shoulder belt as the shoulder belt is moved into the retracted storage position to facilitate unobstructed exit from and entry into the vehicle.

* * * * *